V. D. RENWICK, Jr.
LENS HOLDER FOR HEADLIGHTS.
APPLICATION FILED DEC. 4, 1920.
1,404,649.
Patented Jan. 24, 1922.
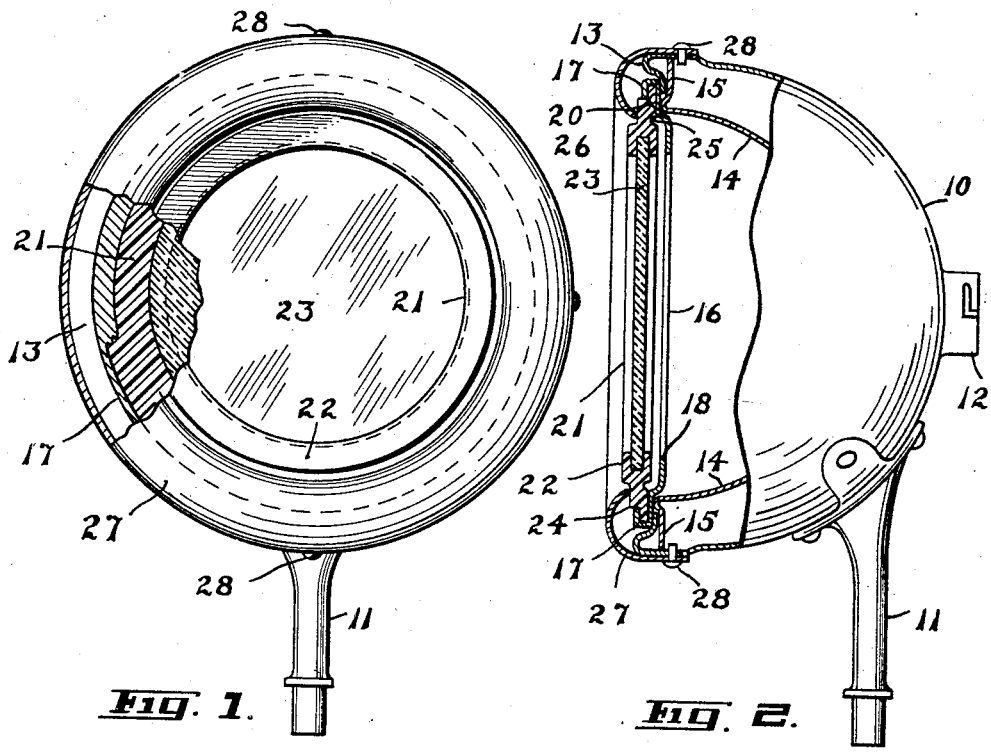
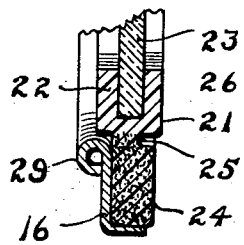
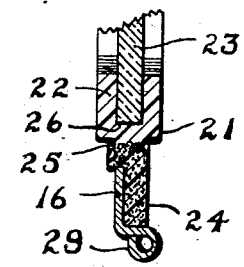
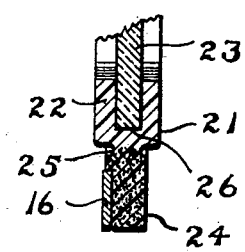
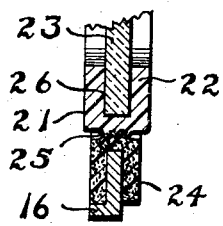
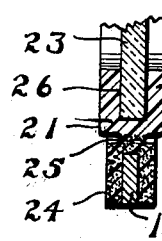
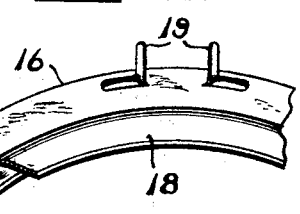
Victor D. Renwick, Jr.
INVENTOR
BY Victor J. Evans
ATTORNEY
John Babis, Jr.
WITNESS:

UNITED STATES PATENT OFFICE.

VICTOR D. RENWICK, JR., OF NORRISTOWN, PENNSYLVANIA.

LENS HOLDER FOR HEADLIGHTS.

1,404,649.

Specification of Letters Patent.　　Patented Jan. 24, 1922.

Application filed December 4, 1920. Serial No. 428,330.

*To all whom it may concern:*

Be it known that I, VICTOR D. RENWICK, Jr., a citizen of the United States, residing at Norristown, in the county of Montgomery and State of Pennsylvania, have invented new and useful Improvements in Lens Holders for Headlights, of which the following is a specification.

This invention relates to lens-holders for headlights of power propelled vehicles and it has more particular reference to means for resiliently mounting the lens or glass plate in the headlight whereby said lens or glass plate is prevented from damage and fracture incident to the vibrations set up when said vehicle is moving.

The primary object of this invention is to provide a novel means for holding the lens relative to the lamp body.

Another object is to provide a lens holding means characterized by the fact that the inner and outer parts thereof differ as regards their inherent resiliency; that is to say, the holding portion which retains the lens proper in place is susceptible more readily to flexure than the portion which virtually constitutes the lens supporting portion.

With the foregoing primary objects in view, and others which will later on be more apparent my invention consists essentially in providing a rubber yielding means for supporting a head-light lens which includes an inner lens retaining or flexible portion, and an outer mounting portion of materially less resilient nature.

In the further disclosure of the invention reference is to be had to the accompanying sheet of explanatory drawings constituting a part of this specification and in which like characters of reference designate the same or corresponding parts in all the several views.

Figure 1— is a front elevation of a headlight embodying my improvements with parts broken away and in section to better disclose the underlying structure.

Figure 2— is a side elevation thereof partly in central vertical section.

Figures 3, 4, 5, 6 and 7, are enlarged detail sectional views of a glass plate or lens with various slightly modified forms of my improved holder mounting and retaining ring applied thereto; and, Figure 8— is an enlarged detail fragmentary perspective view of the holder retaining ring shown in Figures 1 and 2.

Referring more particularly to the drawing my invention is shown as adapted more specifically for use on an automobile headlight comprising a hollow hemispherical lamp body 10 provided with a downwardly projecting stem 11 by means of which said lamp body is mounted in position on the vehicle, an electrical connection or socket 12 being provided for receiving an appropriate coupling connecting with a source of electric current and by means of which the incandescent light—not shown—is illuminated.

The lamp body 10 is provided with opposed projecting tongues which are inwardly flanged as indicated at 13 to constitute a retaining means for the reflector element 14 which is mounted in spaced relation to said body 10 by an outwardly projecting flange or lip 15, and it is to be noted that the flanged parts 13 are somewhat inset and shouldered for the reception of my improved retaining ring referred to generally by the numeral 16.

The retaining ring 16 is preferably made of thin sheet metal which is pressed or spun to the form shown more particularly in Figures 2 and 8, that is to say, it includes a part 17 of substantially channel cross-section and an inwardly dipped flange portion 18 for the purpose later on explained, and it is also provided with a pair of outwardly projecting opposed tongues 19, and an inwardly projecting tongue 20, said tongues being conveniently stamped out therefrom as will be clearly comprehended by those skilled in the art of sheet metal working as applied to lamp manufacture.

Adapted to be sprung into and securely seated in the channel shaped part 17 of the retaining ring 16 is my improved lens or glass holder gasket 21 which is preferably made of rubber or other appropriate material and being of what may be termed forked or Y-shaped cross section. This lens holder or gasket 21 consists of an inner or circumferentially grooved annular part 22 of flexible or resilient grade that constitutes the holder proper for the lamp lens or glass 23, and an outer annular part 24 of more solid or harder nature, with a connecting neck or web 25. The annular part 24 is first of all sprung or otherwise forced into the channel shaped cross sectional part 17 of the retaining ring 16 and it is to be here noted that the inwardly projecting tongue 20 is adapted to protrude between the meeting ends of the gasket 21 when the same is formed from a length of material; or it may project into a transverse cut made for its reception in the part 24 as will be readily understood, and it serves in use to prevent the gasket 21 creeping relative to its retaining ring 16. On the other hand it will be readily seen that when the parts 16, 21 are assembled as set forth that the grooved annular part 22 by reason of its flexible and resilient nature can be easily sprung or snapped on to the peripheral edge of the lens or glass 23, with the edge of the latter snugly seated in the groove 26 for the purpose of holding and supporting said lens or glass 23 when the gasket 21 is seated in the retaining ring 16 in the manner just described. It is also here to be particularly noted that when the parts 16, 21 are assembled as shown and described that the inwardly dipped flange 18 of the retaining ring 16 serves to materially stiffen said ring as well as forming an effective guard against the reflector 14 becoming tarnished due to its close proximity to the rubber gasket 21, it being well known that the sulphur contained in all rubber in greater or less degree readily affects and tarnishes burnished surfaces in contact or close juxtaposition thereto and more particularly when said parts are subject to heat as is the case in connection with headlights.

The lens locking or retaining ring proper is indicated by the numeral 27 and it is conveniently fixed to the lamp body 10 by rivets 28 in the well known way, or it may be hinged thereon and held closed by a suitable catch as will be readily understood, and I wish to here point out that the outwardly projecting tongues 19 hereinbefore referred to in connection with the retaining ring 16 are adapted to engage in cuts or slots in the beaded flange 13 whereby any turning of the former when the parts are assembled is effectively prevented.

In Figures 3 to 7 inclusive, I have shown various modified cross sections of the gasket 21, and retaining ring 16, Figures 3 and 4 showing said ring 16 as formed with a beaded edge 29, whilst Figure 5 shows the ring 16 partially and Figures 6 and 7, show said ring substantially wholly embedded in the outer annular part 24 whereby a material stiffening or increased rigidity of the mounting is ensured as and between the lens holder and lamp body.

From the foregoing description it will be readily seen that by my invention I have made a very material and distinctive advance in the art of mounting headlight and analogous lamp lenses for motor propelled vehicles as it will be clearly seen that any jars or shocks imparted or transmitted to the lamp body 10 will be absorbed by the rubber gasket or lens holder 21 and thereby prevent damage or fracture to the lens. Furthermore it will be clearly seen that my improved structure of lens holder 21 insures a better mounting due to the employment of a higher vulcanized material for the part 24 and the use of which in no way detracts from the resiliency and flexibility of the mounting of the lens 23 relative to the lamp body. Still further I wish to point out that an inherent advantage accruing to my improved lens holder 21 and retaining ring 16 is that the lens 23 is firmly supported and retained in position when in position on the lamp body 10 or when out of the lamp rim 27, door or the equivalent.

Obviously the part 22, 24, of the lens holder or gasket 21 may be separately made and vulcanized or cemented together in any of the well known ways.

Still further I wish to point out that a lens mounted as hereinbefore set forth will be entirely free from any tendency to turn relative to the lamp body, whilst its removal for cleaning can be easily effected and its accurate replacement in proper position, ensured, as the tongues 19 prevent its displacement or inaccurate positioning, and finally it will be noted that when a lens is mounted in the manner described the lamp may be subjected to considerable ill use without fear of said lens being broken due to the flexible mounting.

Whilst I have described and shown the best methods of carrying my invention into practical effect at present known to me, I wish it clearly understood that I do not limit myself to the precise details set forth as other modifications and changes in the shape and arrangement of the several parts may be necessary to adapt my said invention to particular service conditions and I deem myself at liberty to make all such necessary changes as may reasonably fall within the scope of the appended claims.

Having described my invention what I claim as new and desire to secure by Letters Patent is:—

1. In a lamp the combination with the lens, of a surrounding gasket comprising an inner grooved resilient part adapted to grip the periphery of said lens on both sides of its marginal edge and an outer integral part of substantially harder nature, a retaining ring adapted to receive and hold the aforesaid gasket against relative movement, and means for preventing said retaining ring and gasket from rotating relative to the lamp body.

2. In a lamp the combination with a lens and a reflector therefor, of a surrounding gasket comprising an inner grooved resilient part adapted to grip the marginal edge of said lens on both sides, and an outer integral web of substantially less resilient nature, a retaining ring adapted to receive and hold the aforesaid gasket against relative movement, an inwardly stepped flange on said retaining ring serving as a guard between the gasket and reflector, means for supporting the retaining ring in the lamp body, and means for preventing its movement relative thereto.

In testimony whereof I affix my signature.

VICTOR D. RENWICK, Jr.